Patented Oct. 10, 1950

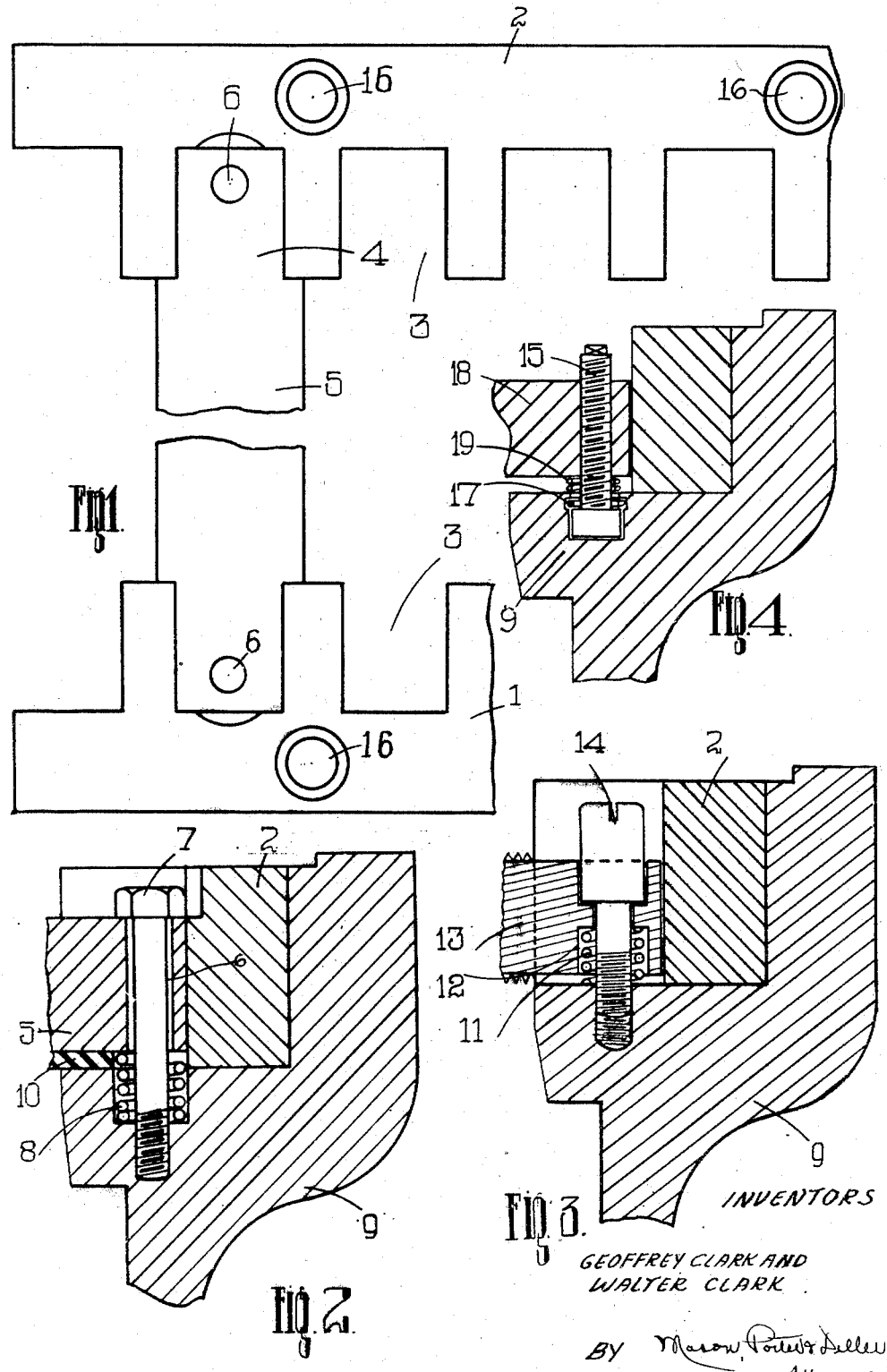

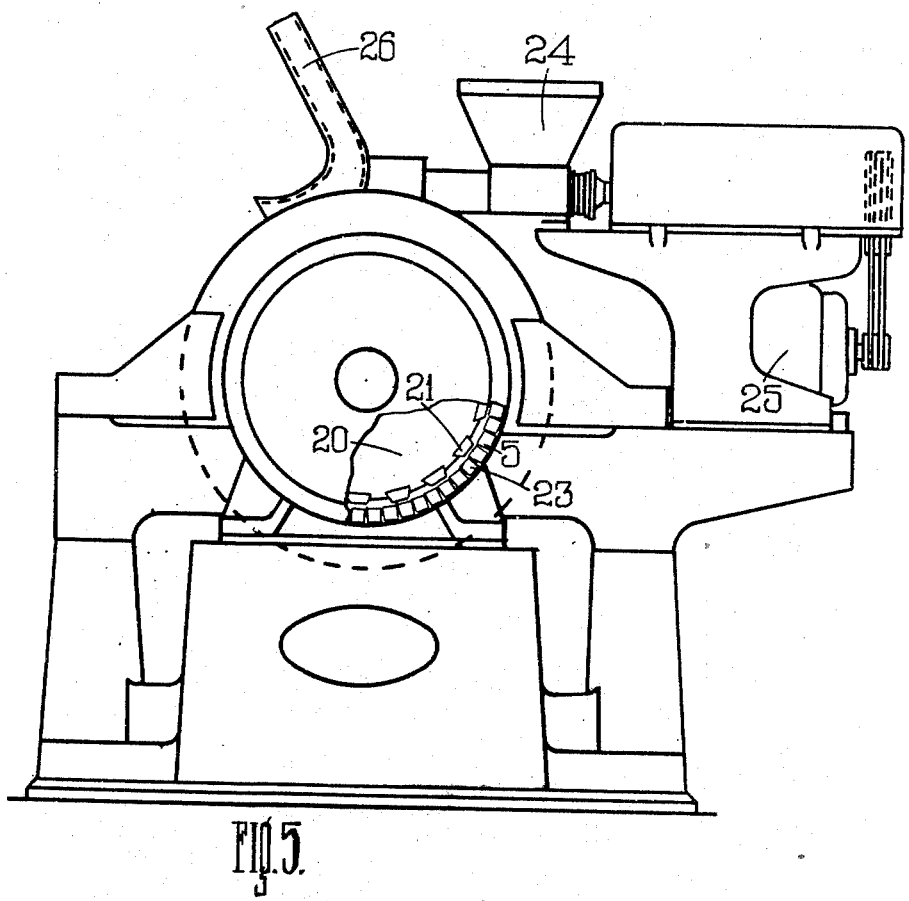

2,525,650

UNITED STATES PATENT OFFICE 2,525,650

MOUNTING AND ADJUSTMENT OF STATOR BLADES IN GRINDING, CRUSHING, AND PULVERIZING MACHINERY

Geoffrey Clark and Walter Clark, Kingston-upon-Hull, England

Application January 2, 1945, Serial No. 571,040
In Great Britain January 12, 1944

1 Claim. (Cl. 241—83)

The present invention relates to improvements in grinding, crushing and pulverising machines of the type in which a rotor carries a series of cutting or grinding blades disposed around its outer periphery to co-operate with a complementary series of stator blades.

It has been usual to adjust the radial disposition of such stator blades by the interposition of shims between the under ends of such stator blades and the frame members.

An object of the present invention is to avoid the necessity of dismantling parts of the machinery in order to obtain a fresh adjustment of the blades.

The invention is further described with reference to the accompanying drawings, in which:

Figure 1 is a view taken from the interior showing the development of two stator segments and showing the manner of mounting one of the blades thereon; the frame member on which the stator segments are mounted is omitted from this view.

Figure 2 is a part detail sectional view of one arrangement of mounting the blades.

Figures 3 and 4 are views similar to Figure 2 of further modified arrangements.

Figure 5 is a general view of the machine.

The machine to which the improved blade mounting is applied may be for instance of the type of our U. S. Patent No. 2,219,720 dated October 29, 1940. In this type of machine a rotor 20 has cutting blades 21 co-operating with stator blades 5 on a stator 23. The machine is fed from a hopper 24 by a worm feed driven by motor 25 and exhausts ground product through conduit 26 (see Figure 5).

The stator segments 1, 2 (Fig. 1), mounted upon the frame members by means of bolts passing through perforations 16, are provided with radial recesses, as shown at 3 to receive the ends 4 of rectangular blades 5, these ends being perforated as at 6 to receive threaded bolts such as 7 (Fig. 2) screwed into the stator frame member 9, compression springs 8 being disposed between the rectangular blade elements 5 and the base sockets in the frame members 9 carrying the stator segments 2.

If desired, rubber or the like elastic packing material 10 may be disposed between the blade elements 5 and the frame 9 to prevent solid matter forming under the ends of the blades and thus interfering with their free adjustment before the blades reach their positive zero setting.

In the alternative arrangement shown in Fig. 3, the springs 11, similar to the springs 8 are housed in sockets 12 in the blade elements 13 instead of in the frame, and the bolts 14 adjustably screwed into the frame 9 are similarly socketted into the blades 13.

In the alternative form of construction shown in Fig. 4 cheese-headed or similar bolts 15 may have their heads located but free to revolve in the frame members 9 being held by a spring expansive split ring 17, the shanks of the bolts 15 being suitably threaded to engage with threaded holes through the ends of the blades 18, thus giving a positive action in both directions, and a spring 19 may be suitably placed to take up any play in the threads, the ends of the shanks being formed so as to enable them to be rotated.

We declare that what we claim is:

An apparatus for reduction of material into powder form comprising in combination a rotor having an annular periphery, blades on said rotor, a stator, blades on said stator having perforated ends, threaded bolts carried by said stator and passing freely through the perforated ends of said blades, stop heads on said bolts of greater diameter than the perforations in said blades, means to adjust said stop heads to set the limit of displacement of said blades radially outwards from the rotor, elastic means between said blades and said stator held in compression by said bolts to hold said stator blades against said stop heads, and resilient packing between the ends of said stator blades and said stator sealing access of powdered material from the interior of the stator to said perforations.

GEOFFREY CLARK.
WALTER CLARK.

REFERENCES CITED

The following references are of record in the file of this patent:

UNITED STATES PATENTS

| Number | Name | Date |
|---|---|---|
| 57,541 | Melick | Aug. 28, 1866 |
| 111,034 | Bradford | Jan. 17, 1871 |
| 121,415 | Pitts et al. | Nov. 28, 1871 |
| 137,035 | Smith | Mar. 18, 1873 |
| 239,840 | Powers | Apr. 5, 1881 |
| 245,176 | Jones | Aug. 2, 1881 |
| 294,241 | Kahnweiler | Feb. 26, 1884 |
| 493,531 | Straker | Mar. 14, 1893 |
| 821,447 | Albrecht | May 22, 1906 |
| 948,508 | Kappler et al. | Feb. 8, 1910 |
| 1,027,320 | Chandler | May 21, 1912 |
| 1,044,441 | Buchanan | Nov. 12, 1912 |
| 1,365,228 | Davidson | Jan. 11, 1921 |
| 1,606,225 | Hopkins et al. | Nov. 9, 1926 |
| 1,721,183 | McKann | July 16, 1929 |
| 1,740,787 | Sensenbaugh | Dec. 24, 1929 |
| 2,216,612 | Dimm | Oct. 1, 1940 |